US009243962B2

(12) United States Patent
Ko et al.

(10) Patent No.: US 9,243,962 B2
(45) Date of Patent: Jan. 26, 2016

(54) COMPOSITION FOR SENSOR ELEMENT, TEMPERATURE SENSOR AND METHOD FOR MANUFACTURING TEMPERATURE SENSOR

(71) Applicant: Hyundai Motor Company, Seoul (KR)

(72) Inventors: Na-Yun Ko, Seoul (KR); Tae Seung Lee, Gyeonggi-do (KR); Jin-Seong Park, Gwangju (KR); Woon-Young Lee, Gwangju (KR)

(73) Assignee: Hyundai Motor Company, Seoul (KR)

( * ) Notice: Subject to any disclaimer, the term of this patent is extended or adjusted under 35 U.S.C. 154(b) by 428 days.

(21) Appl. No.: 13/715,926

(22) Filed: Dec. 14, 2012

(65) Prior Publication Data

US 2013/0308683 A1 Nov. 21, 2013

(30) Foreign Application Priority Data

May 18, 2012 (KR) ............................. 10-2012-53210

(51) Int. Cl.
*H01C 7/10* (2006.01)
*G01K 7/16* (2006.01)
*H01C 7/06* (2006.01)
*H01C 17/065* (2006.01)
(Continued)

(52) U.S. Cl.
CPC .. *G01K 7/16* (2013.01); *G01K 7/18* (2013.01); *H01C 7/06* (2013.01); *H01C 17/06533* (2013.01); *H01C 17/06546* (2013.01); *H01C 17/20* (2013.01)

(58) Field of Classification Search
CPC ............. H01C 7/06; H01C 7/18; H01C 7/16; H01C 17/20; H01C 17/06533; H01C 17/06546
USPC .................................. 338/22 R, 13; 252/500
See application file for complete search history.

(56) References Cited

U.S. PATENT DOCUMENTS

| | | | | |
|---|---|---|---|---|
| 5,246,628 A | * | 9/1993 | Jung et al. .................. | 252/519.5 |
| 6,261,480 B1 | * | 7/2001 | Ogata et al. ................ | 252/520.5 |
| 6,319,429 B1 | * | 11/2001 | Moos et al. .............. | 252/519.15 |

(Continued)

FOREIGN PATENT DOCUMENTS

| | | |
|---|---|---|
| JP | 08271347 A | 10/1996 |
| JP | 11251109 A | 9/1999 |

(Continued)

*Primary Examiner* — Kyung Lee
(74) *Attorney, Agent, or Firm* — Mintz Levin Cohn Ferris Glovsky and Popeo, P.C.; Peter F. Corless

(57) ABSTRACT

Disclosed herein is a composition of a sensor element, a temperature sensor having the composition of the sensor element and a method of manufacturing the temperature sensor. The sensor element composition comprising $Y_2O_3$, $Al_2O_3$, $MnO_2$, NiO and $Fe_2O_3$, and further comprising $ZrO_2$ and a temperature sensor comprising the same. The method comprising: weighing the composition for a sensor element; mixing the composition; calcining the mixture at about 1000° C.~1400° C. for 30 min~5 hrs; pulverizing the calcined mixture to obtain powder; disposing the powder type mixture into a mold; inserting in parallel a plurality of lead wires into the powder type mixture; pressure molding the powder type mixture; and sintering the pressure molded material at about 1300° C.~1500° C. for 30 min~5 hrs.

1 Claim, 3 Drawing Sheets

(51) Int. Cl.
*H01C 17/20* (2006.01)
*G01K 7/18* (2006.01)

(56) References Cited

U.S. PATENT DOCUMENTS

| | | | |
|---|---|---|---|
| 7,559,494 B1* | 7/2009 | Yadav et al. | 241/23 |
| 7,656,269 B2* | 2/2010 | Mizoguchi et al. | 338/22 R |
| 2002/0088965 A1* | 7/2002 | Ogata et al. | 252/500 |
| 2003/0012953 A1* | 1/2003 | Yadav et al. | 428/402 |
| 2003/0038704 A1* | 2/2003 | Kuzuoka et al. | 338/22 R |
| 2003/0205698 A1* | 11/2003 | Ogata et al. | 252/500 |
| 2009/0016409 A1* | 1/2009 | Mizoguchi et al. | 374/185 |
| 2013/0308683 A1* | 11/2013 | Ko et al. | 374/185 |

FOREIGN PATENT DOCUMENTS

| | | |
|---|---|---|
| JP | 2003-68507 A | 3/2003 |
| KR | 10-0127636 B1 | 12/1997 |
| KR | 10-2012-0020836 | 3/2012 |

* cited by examiner

COMPOSITION FOR SENSOR ELEMENT, TEMPERATURE SENSOR AND METHOD FOR MANUFACTURING TEMPERATURE SENSOR

CROSS-REFERENCE TO RELATED APPLICATION

This application claims priority under 35 U.S.C. §119 to Korean Patent Application No. 10-2012-53210, filed on May 18, 2012, in the Korean Intellectual Property Office, the disclosure of which is incorporated herein by reference in its entirety.

BACKGROUND

1. Field of the Invention

The present invention relates to a composition of a sensor element, a temperature sensor and a method of manufacturing the temperature sensor having the composition of the sensor element. More particularly, the present invention relates to a composition for a sensor element having improved accuracy and thermal stability in sensing temperature, and a temperature sensor, wherein wires are inserted into a sensor element, comprising the same composition and which has heat resistance, impact resistance, vibration resistance, durability and the like to perform temperature sensing at a high temperature and under a vibration condition; and a method for manufacturing the temperature sensor.

2. Description of the Related Art

Recently, as restrictions on environmentally harmful gases from vehicles increase, systems are being developed for a gas reducing device for vehicles. Particularly, in diesel vehicles, nitrogen oxides (NOx) and the like are generated during fuel combustion. For example, diesel vehicles may emit particulate matter (PM) of less than 0.005 g per 1 km, and to regulate this exhaust, a DPF (Diesel Particulate Filter) system as an exhaust gas reducing device may be used. The DPF system installed in an exhaust collects particulate matter in the exhaust gas using a catalyst filter and controls a regeneration process combusting the collected PM when certain condition is satisfied.

Moreover, the regeneration process is conducted at a temperature for optimum efficiency (e.g., at the temperature where the particulate matter collected in the filter is combusted). To accomplish this process, an accurate and durable temperature sensor must be installed in the DPF system. Further, the temperature sensor is installed in a combustion device and related parts commonly used for vehicles, to accurately sense temperature at any temperature, and to maintain normal vehicle operation with strong impact resistance and durability.

The temperature sensor is a device configured to sense temperature using the change of material density, resistance, electromotive force and the like according to temperature, and the temperature sensor includes a thermocouple, a resistance temperature detector, a thermistor (NTC) thermometer and the like. The thermocouple thermometer is a thermometer using thermal electromotive force of a thermocouple, and it measures temperature by thermal electromotive force value, which is generated according to a changing temperature of one contact point when both ends of two metal wires are connected and the other contact point is maintained to a fixed temperature. Further, the resistance thermometer bulb is a device measuring temperature by resistance value using the change of electric resistance of metal or semiconductor according to temperature. The thermistor thermometer is generally manufactured by sintering metal oxides, and the thermistor is a device changing electric resistance according to the change of temperature.

The thermistor thermometer is classified into a PTC (Positive temperature coefficient) thermistor and a NTC (Negative temperature coefficient) thermistor. The PTC thermistor increases resistance value according to an increasing temperature, and the NTC thermistor decreases resistance value according to an increasing temperature.

The temperature sensor used for the exhaust system of a vehicle should be operated at the temperature of about 500° C. or higher, and should have thermal shock resistance resisting repetitive temperature change between high temperature and room temperature, and vibration resistance and impact resistance resisting extreme vibration often generated during vehicle running.

Conventional temperature sensors generally comprise a sensor element and lead wires, and the sensor element is commonly manufactured with metals or metal oxides. Conventionally, the metal oxides are insulators, but when transition metal oxides are mixed therewith and are sintered, they have semiconductive conductivity. Particularly, the temperature sensor used at a high temperature prepared through a ceramic process by mixing a composition for a sensor element comprising transition metal oxides such as $Fe_2O_3$, NiO, $Cr_2O_3$, $MnO_2$ and the like, calcining and sintering the composition, may reduce accuracy of sensing temperature due to error caused by thermal stability reduction at 500° C. or higher and low resistance as several ohms.

Moreover, the conventional temperature sensor is manufactured by printing or gilding paste electrodes of silver (Ag), gold (Au), platinum (Pt) and the like on the surface of the sensor element, and attaching lead wires or pins of nickel (Ni), Pt, Au, copper (Cu) and the like thereon, and when the surface electrodes are used, the lead wires or pins can easily be separated from the element surface and disconnected at a high temperature or under extreme vibration.

The description provided above as a related art of the present invention is for helping understanding the background of the present invention and should not be construed as being included in the related art known by those skilled in the art.

SUMMARY OF THE INVENTION

The present invention has been made in an effort to solve the above-described problems associated with the prior art. The present invention provides a composition for a sensor element exhibiting improved thermal stability and accuracy by comprising $Y_2O_3$, $Al_2O_3$, $MnO_2$, NiO and $Fe_2O_3$ as metal oxides, and further comprising $ZrO_2$.

Furthermore, the present invention provides a temperature sensor exhibiting improved thermal shock resistance, impact resistance, vibration resistance and the like by inserting lead wires into the sensor element comprising the composition for a sensor element; and a method for manufacturing the temperature sensor. The composition for a sensor element of the present invention comprises $Y_2O_3$, $Al_2O_3$, $MnO_2$, NiO and $Fe_2O_3$, and further comprises $ZrO_2$. Moreover, in one embodiment of the present invention, a molar concentration of Zirconium (Zr) used in the composition for a sensor element is about 0.2~0.5. In addition, in another embodiment of the present invention, a molar concentration of metallic elements, Yttrium (Y), Aluminum (Al), Manganese (Mn), Nickel (Ni) and Iron (Fe), used in the composition for a sensor element is about 0.2~0.5, 0.01~0.1, 0.1~0.3, 0.1~0.3 and 0.03~0.1, respectively.

The temperature sensor of the present invention comprises: a sensor element, which includes the composition for a sensor element; and two lead wires, inserted into the sensor element parallel to each other.

Furthermore, the method for manufacturing the temperature sensor of the present invention comprises: weighing the composition for a sensor element; mixing the composition; calcining the mixture at about 1000° C.~1400° C. for 30 min~5 hrs; pulverizing the calcined mixture to obtain powder; providing the powder type mixture into a mold; inserting two lead wires parallel to each other into the powder type mixture disposed in the mold; pressure molding the powder type mixture; and sintering the pressure molded material at about 1300° C.~1500° C. for 30 min~5 hrs. In addition, the calcination may be performed at about 1200° C. for 2 hrs and the sintering may be performed at about 1400° C. for 1 hr.

BRIEF DESCRIPTION OF THE DRAWINGS

The above and other features and advantages of the present invention will now be described in detail with reference to exemplary embodiments thereof illustrated the accompanying drawings which are given hereinbelow by way of illustration only, and thus are not limitative of the present invention, and wherein.

Figure 1:
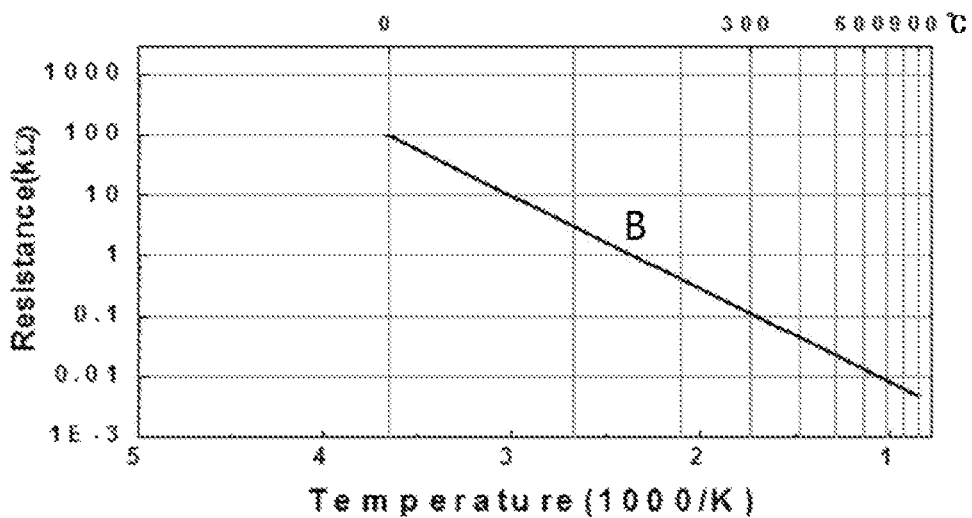
FIG. 1 is an exemplary temperature-resistance graph of a $Y_{0.44}Al_{0.04}Mn_{0.108}Fe_{0.064}Ni_{0.108}O_{1.14}$ composition for a sensor element not adding $ZrO_2$ according to a conventional compositions for a sensor element.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, the present invention now will be described in detail with reference to the accompanying drawings.

In one embodiment, the present invention provides a composition for a sensor element having improved accuracy and thermal stability, the composition comprising $Y_2O_3$, $Al_2O_3$, $MnO_2$ and NiO as transition metal oxides, and an iron oxide selected from a group consisting of FeO, FeO2, $Fe_2O_3$ and $Fe_3O_4$. The composition may further comprise $ZrO_2$, which has a high stability and resistance value at a high temperature.

The composition for a sensor element comprising transition metal oxides may have a characteristic that resistance value changing according to temperature. The composition of the sensor element may used in a temperature sensor by using a principle measuring random resistance value and sensing temperature corresponding to the value. To sense a high temperature accurately, the resistance value should be accurately measured at a high temperature. A composition for a sensor element comprising transition metal oxides such as $Fe_2O_3$, NiO, $Cr_2O_3$, $MnO_2$ and the like having low resistance value as several ohms at high temperature of 500° C. or higher, may not accurately measuring the resistance value and precisely sense the temperature corresponding to the resistance value. In addition, in using the transition metal oxides, the thermal stability of the composition for a sensor element may not be secured at high temperature, thereby needing to control a compositional ratio of the composition or to add new material for securing the thermal stability.

Therefore, the composition for a sensor element of the present invention may comprise $Y_2O_3$, $Al_2O_3$, $MnO_2$, NiO and $Fe_2O_3$ as metal oxides, and may further comprise $ZrO_2$, which has stability and high resistance value particularly at high temperature.

Further, the reagents used in the present invention may be oxides such as $Y_2O_3$, $Al_2O_3$, $MnO_2$, NiO, $Fe_2O_3$ and $ZrO_2$, and their chemical composition may be assumed to have a molar constant ratio before and after thermal treatment. In addition, metal ingredients may be oxidized to be used in the composition, and the molar ratio of transition metal oxides may be changed.

Particularly, a molar concentration of Zr used in the composition for a sensor element may be about 0.2~0.5. Further, a molar concentration of the metallic elements, Y, Al, Mn, Ni and Fe, used in the composition for a sensor element may be about 0.2~0.5, 0.01~0.1, 0.1~0.3, 0.1~0.3 and 0.03~0.1, respectively. According to an ingredient content of the composition, thermal stability and accuracy for sensing temperature at high temperature may be adjusted, and through various experiments the composition for a sensor element showed optimum effect when the composition included the ingredients and compositional ratio described herein.

Specifically, in one embodiment of the present invention, the composition for a sensor element comprising $Y_2O_3$, $Al_2O_3$, $MnO_2$, NiO and $Fe_2O_3$ as metal oxides, and further comprising $ZrO_2$ was weighed and mixed to obtain compositional ratio of $Zr_{0.24}Y_{0.44}Al_{0.04}Mn_{0.108}Fe_{0.064}Ni_{0.108}O_{1.62}$. The mixture was calcined at about 1200° C. for 2 hrs, wherein the calcination is a thermal treatment process removing a part or all of volatile ingredients by heating any material at high temperature for uniform mixing.

Further, the calcined mixture was pulverized to obtain powder, the powder type mixture was disposed into a mold, two lead wires were inserted parallel to each other into the powder type mixture disposed into a mold and the mixture was pressure molding to about 2×2×2 mm, and then the pressure molded material was sintered at about 1400° C. for 1 hr to obtain a sensor element sample. The sintering is a thermal treatment process for solidifying the material, which is made by pressure molding the powder to a shape.

Moreover, the compositional ratio of the composition, size of the sample, thermal treatment temperature, thermal treatment time and the like, used in the above embodiment, may be changed according to the required characteristics of the sensor.

Figure 2:
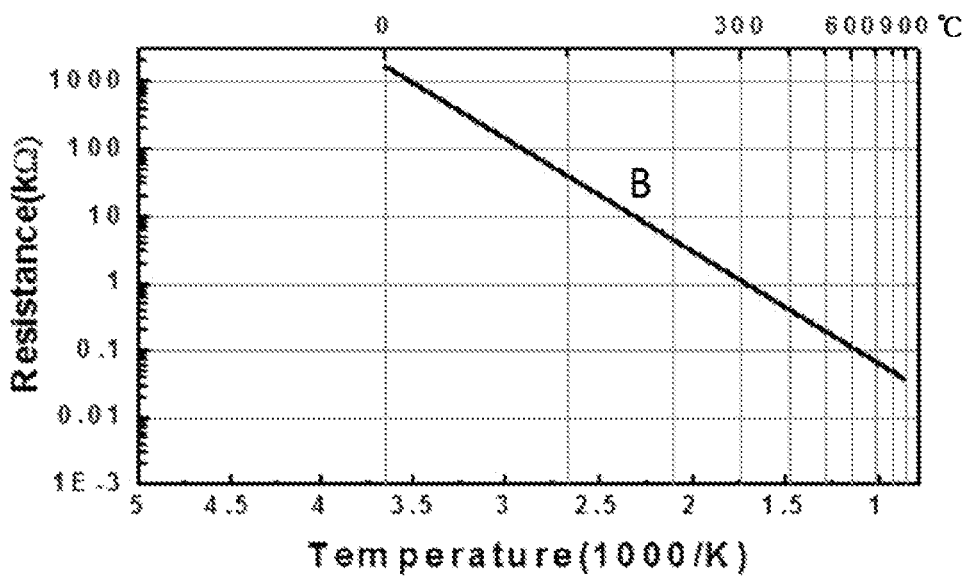
FIG. 2 is an exemplary temperature-resistance graph of a $Zr_{0.24}Y_{0.44}Al_{0.04}Mn_{0.108}Fe_{0.064}Ni_{0.108}O_{1.62}$ composition for a sensor element adding $ZrO_2$ to the conventional composition for a sensor element, according to an exemplary embodiment of the present invention.

FIG. 1 is an exemplary temperature-resistance graph of a $Y_{0.44}Al_{0.04}Mn_{0.108}O_{1.14}$ composition for a sensor element not adding $ZrO_2$ according to a conventional composition for a sensor element, and FIG. 2 is an exemplary temperature-resistance graph of $Zr_{0.24}Y_{0.44}Al_{0.04}Mn_{0.108}Fe_{0.064}Ni_{0.108}O_{1.62}$ composition for a sensor element adding $ZrO_2$ to the conventional composition for a sensor element according to an exemplary embodiment of the present invention.

An equation for calculating slope B which is a linear slope, on the temperature-resistance graph is $$B=\ln(R_1/R_2)/(1/T_1-1/T_2),$$

wherein $R_1$ is a resistance value at absolute temperature $T_1$, and $R_2$ is a resistance value at absolute temperature $T_2$.

As shown in FIG. 1, the $Y_{0.44}Al_{0.04}Mn_{0.108}Fe_{0.064}Ni_{0.108}O_{1.14}$ composition for a sensor element not adding $ZrO_2$ may have a resistance value of about 100 Kohms at 0° C., the resistance value of about 5 ohms at 900° C. and a slope B of about 3550, and there is a problem that error is generated when measured by common measuring method due to too low resistance value at 900° C.

However, as shown in FIG. 2, $Zr_{0.24}Y_{0.44}Al_{0.04}Mn_{0.108}Fe_{0.064}Ni_{0.108}O_{1.62}$ composition for a sensor element adding $ZrO_2$ to the composition for a sensor element as one example of the present invention was observed to have the resistance value of about 1.7 Mohms at 0° C., the resistance value of about 40 ohms at 900° C. and slope B of about 3800. Due to the linearity of the composition and a substantially high resistance value of about 40 ohms at 900° C., the composition temperature may be easily measured by a general measuring method without extra amplification or correction.

Figure 3:
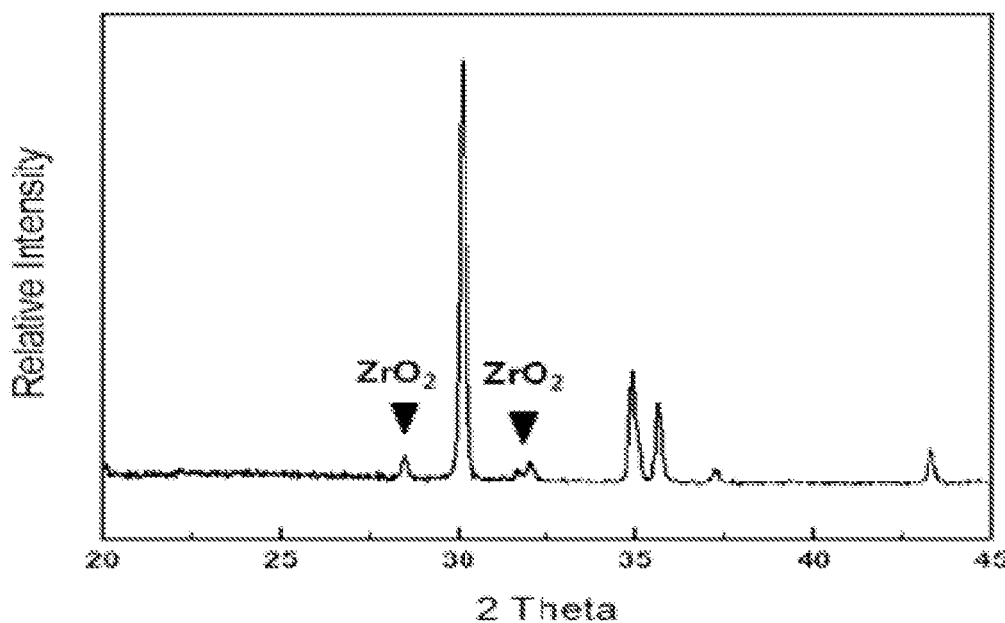
FIG. 3 is an exemplary XRD graph of a $Zr_{0.24}Y_{0.44}Al_{0.04}Mn_{0.108}Fe_{0.064}Ni_{0.108}O_{1.62}$ composition for a sensor element, according to an exemplary embodiment of the present invention.

FIG. 3 is an exemplary X-Ray Diffraction (XRD) graph of the $Zr_{0.24}Y_{0.44}Al_{0.04}Mn_{0.108}Fe_{0.064}Ni_{0.108}O_{1.62}$ composition for a sensor element. As shown in FIG. 3, that the $ZrO_2$ peak remained on the XRD graph, meaning that the $ZrO_2$ exists in the composition as an independent phase. Thus, a composition for a sensor element having improved accuracy and thermal stability may be provided because the $ZrO_2$, which is added to the conventional composition for a sensor element having stability and high resistance at high temperature, exists as an independent phase.

Figure 4:
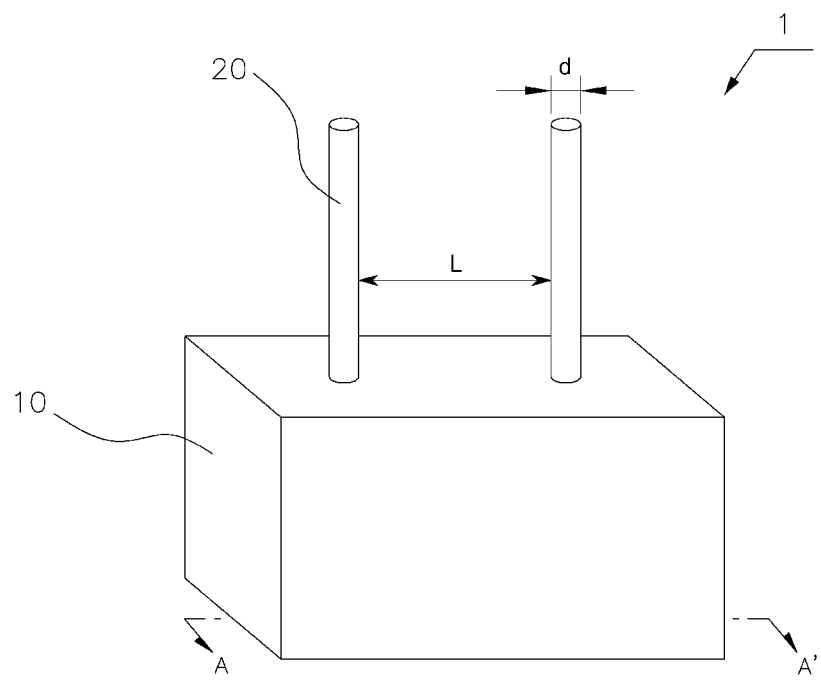
FIG. 4 is an exemplary view of a temperature sensor comprising the composition for a sensor element, according to an exemplary embodiment of the present invention.
Figure 5:
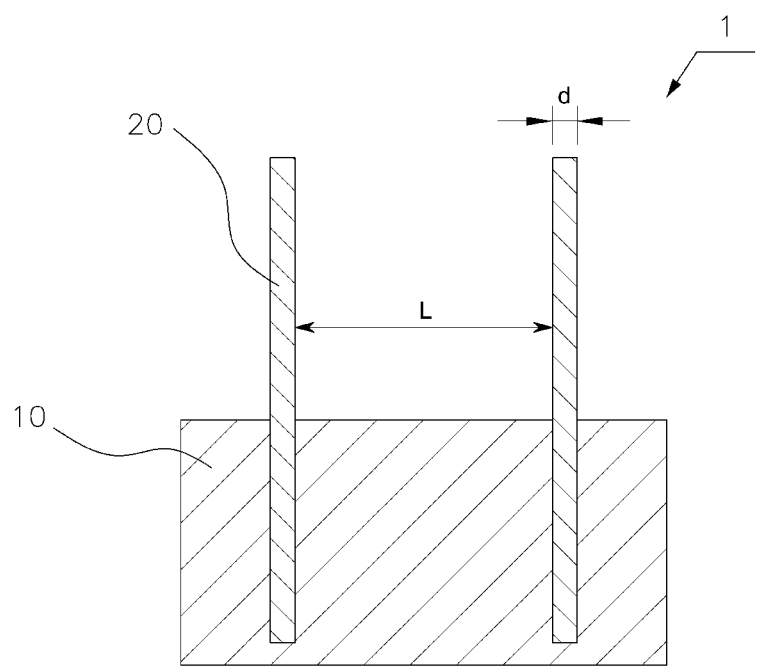
FIG. 5 is an exemplary sectional view of the temperature sensor of FIG. 4 cut along A-A', according to an exemplary embodiment of the present invention.

FIG. 4 is an exemplary view of a temperature sensor using a sensor element comprising the composition for a sensor element of the present invention, and FIG. 5 is an exemplary sectional view of the temperature sensor of FIG. 4 cut along A-A'.

As shown in FIG. 4, the temperature sensor 1 may comprise a sensor element 10 and two lead wires 20, which are inserted into the sensor element 10 and are separated by a space L and have diameters d, respectively. Pure platinum (Pt) lead wire may be used as the lead wire 20, but to enhance mechanical strength, Pt-13% rhodium (Rh) lead wire, wherein 13% Rh is added to Pt, may be used.

Further, after sintering, to have higher resistance value, the space L between the two lead wires 20 increases. However, the space L must be adjusted because as the space increases, the lead wires 20 move closer to both sides of the sensor element 10, causing fixing powder to reduce and durability to decrease.

Specifically, in one embodiment of the present invention, the composition for a sensor element comprising $Y_2O_3$, $Al_2O_3$, $MnO_2$, NiO and $Fe_2O_3$ as metal oxides and further comprising $ZrO_2$ was weighed and mixed to have compositional ratio of $Zr_{0.24}Y_{0.44}Al_{0.04}Mn_{0.108}Fe_{0.064}Ni_{0.108}O_{1.62}$, and the calcining of the mixture was performed at about 1200° C. for 2 hrs. The calcined mixture was pulverized to obtain powder, the powder type mixture was disposed into a mold, and the two lead wires 20 were inserted parallel to each other into the powder type mixture with a space of 0.6 mm. In addition, the mixture was pressure molded thereof to the size of 2×2×2 mm.

Moreover, when the pressure is applied perpendicular to the lead wires 20, the lead wires 20 may be deformed by abnormal powder filling distribution, non-uniform pressure and the like. Therefore, the pressure may be applied in parallel to the direction of inserting the lead wires 20. Further, in the process, when the two lead wires 20 are inserted through the sensor element to a bottom thereof, malfunction may occur due to contact between the metal and the lead wires 20 when inserted into a metal tube.

Furthermore, the pressure molded material may be sintered at about 1400° C. for 1 hr to obtain a sample of a temperature sensor 1. In this experiment, the sensor element 10 shrunk about 10% by physicochemical reaction of the metal oxides contained in the sensor element 10 during the sintering process, and accordingly, the sensor element 10 and the inserted two lead wires 20 were more firmly fixed. The lead wires 20 may be prevented from separating from the sensor element to provide a temperature sensor 1 having improved vibration resistance, impact resistance, durability and the like. In addition, the compositional ratio of the composition, size of the sample, the space L between the two lead wires, diameters d of the two lead wires, thermal treatment temperature, thermal treatment time and the like, used in the above embodiment, may be changed according to the required characteristics of a sensor.

In the present invention the resistance value may be easily measured with a general measuring instrument, and thus a temperature corresponding to the resistance value may be accurately measured using a composition for a sensor element, which has thermal stability and a substantially high resistance of several Mohms at room temperature and several ohms at high temperature, wherein the composition may comprise $Y_2O_3$, $Al_2O_3$, $MnO_2$, NiO and $Fe_2O_3$ as transition metal oxides and may further comprise $ZrO_2$ having stability and high resistance particularly at high temperature.

Further, when the two lead wires are inserted into the sensor element followed by pressure molding thereof, and the resulting molded material is sintered at high temperature, the lead wires may be firmly fixed to the sensor element by the sensor element shrinking during the sintering process. Thus, the lead wires may be prevented from separating from the sensor element, thereby enhancing vibration resistance, impact resistance, durability and the like of the temperature sensor of the present invention.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A composition for a sensor element comprising $Y_2O_3$, $Al_2O_3$, $MnO_2$, NiO and $Fe_2O_3$, and further comprising $ZrO_2$, configured to be used in a temperature sensor,
   wherein the sensor element has thermal stability and a substantially high resistance of several Mohms at room temperature and several ohms at high temperature,
   wherein a molar concentration of Zr used in the composition for the sensor element is about 0.2~0.5,
   wherein a molar concentration of the metallic elements, Yttrium, Aluminum, Manganese, Nickel and Iron, used in the composition for the sensor element is about 0.2~0.5, 0.01~0.1, 0.1~0.3, 0.1~0.3 and 0.03~0.1, respectively.

* * * * *